United States Patent
Babler et al.

(10) Patent No.: US 9,414,544 B2
(45) Date of Patent: Aug. 16, 2016

(54) PICK-UP HEAD INCLUDING AN ANTI-WRAPPING DEVICE

(71) Applicant: Kuhn North America, Inc., Brodhead, WI (US)

(72) Inventors: Damion Babler, Brodhead, WI (US); Dennis Williams, Brodhead, WI (US)

(73) Assignee: Kuhn North America, Inc., Brodhead, WI (US)

( * ) Notice: Subject to any disclaimer, the term of this patent is extended or adjusted under 35 U.S.C. 154(b) by 0 days.

(21) Appl. No.: 14/635,517

(22) Filed: Mar. 2, 2015

(65) Prior Publication Data

US 2015/0272004 A1  Oct. 1, 2015

Related U.S. Application Data

(60) Provisional application No. 61/971,858, filed on Mar. 28, 2014.

(51) Int. Cl.
*A01D 43/02* (2006.01)
*A01D 89/00* (2006.01)

(52) U.S. Cl.
CPC .............. *A01D 89/00* (2013.01); *A01D 89/002* (2013.01)

(58) Field of Classification Search
CPC ... A01D 57/03; A01D 61/008; A01D 89/002; A01D 57/02; A01D 89/00; A01D 80/02
USPC .............................. 384/130, 281; 56/364, 220
See application file for complete search history.

(56) References Cited

U.S. PATENT DOCUMENTS

| | | | |
|---|---|---|---|
| 2,548,329 A * | 4/1951 | Sickle | A01D 89/002 171/90 |
| 2,575,531 A | 11/1951 | Russell | |
| 3,472,008 A * | 10/1969 | Hurlburt | A01D 57/03 56/1 |
| 4,297,833 A * | 11/1981 | Gaeddert | A01D 89/002 56/364 |
| 4,344,442 A * | 8/1982 | Torland | A01F 7/06 460/116 |

(Continued)

FOREIGN PATENT DOCUMENTS

EP    2 342 967 A1   7/2011
WO   WO 2014/021717 A1   2/2014

OTHER PUBLICATIONS

Extended European Search Report issued Aug. 27, 2015 in Patent Application No. 15161134.0.

*Primary Examiner* — Árpád Fábián-Kovács
(74) *Attorney, Agent, or Firm* — Oblon, McClelland, Maier & Neustadt, L.L.P

(57) ABSTRACT

A pick-up head may be provided with an anti-wrapping device to prevent materials from wrapping around the pick-up head. The pick-up head may include a plurality of tine bars for carrying a plurality of pick-up teeth. The tine bars may be rotatably supported by a drive shaft and the drive shaft may be secured to end plates of the pick-up head. The anti-wrapping device may be attached to an end of the tine bars to fill in gaps between the tine bars and to create a surface rotatable with the tine bars that is less susceptible to wrapping.

19 Claims, 6 Drawing Sheets

(56) References Cited

U.S. PATENT DOCUMENTS

| | | | | |
|---|---|---|---|---|
| 4,408,618 A | * | 10/1983 | Witzel | A01F 7/06 460/80 |
| 4,574,815 A | * | 3/1986 | West | A01F 12/442 460/80 |
| 5,007,235 A | * | 4/1991 | Nickel | A01D 57/03 384/281 |
| 5,359,839 A | * | 11/1994 | Parsons | A01D 57/03 460/122 |
| 6,502,379 B1 | * | 1/2003 | Snider | A01D 57/02 56/221 |
| 6,640,527 B2 | * | 11/2003 | Farley | A01D 61/008 56/12.4 |
| 7,146,790 B2 | * | 12/2006 | Duquesne | A01D 75/18 56/220 |
| 2003/0110752 A1 | * | 6/2003 | Dow | A01D 89/00 56/364 |
| 2005/0284124 A1 | * | 12/2005 | Patterson | A01D 61/008 56/364 |
| 2014/0260170 A1 | * | 9/2014 | Denson | A01D 89/00 56/364 |
| 2015/0313081 A1 | * | 11/2015 | Jost | A01D 57/03 56/17.3 |

* cited by examiner

PICK-UP HEAD INCLUDING AN ANTI-WRAPPING DEVICE

CROSS-REFERENCE TO RELATED APPLICATIONS

This application is based upon and claims the benefit of priority from U.S. Provisional Patent Application No. 61/971,858, filed on Mar. 28, 2014; the entire contents of which are incorporated herein by reference.

BACKGROUND OF THE DISCLOSURE

1. Field of the Disclosure

The present disclosure relates to a pick-up head for lifting material from the ground. In agricultural applications, the pick-up head may be utilized on a merger where the pick-up head may lift material, such as crops, from a field and then transfer the material to a conveyer. The conveyer may then shift the material laterally to form a windrow that can later be picked up.

2. Description of the Related Art

In related art, pick-up heads may include a plurality of radially extending pick-up teeth. Pick-up guards may be provided between the pick-up teeth along a lateral direction of the pick-up heads to help guide material up and over the pick-up head towards a conveyer. However, in the manufacturing of large agricultural equipment, it is common for parts and components to be designed with a certain amount of tolerance to allow components to interact and prevent unwanted interference.

FIG. 1 shows a pick-up head 100 in the related art comprising a plurality of pick-up teeth 110 that are supported on tine bars 120. The pick-up teeth 110 extend radially from a center of the pick-up head 100 and are arranged along a lateral direction of the pickup head 100. A plurality of guards 130 are provided between the pick-up teeth along the lateral direction. In operation, a small amount of material may traverse a length of the pick-up teeth 110 and travel between the guards 130. The material may then wrap around an inner portion 140 of the pick-up head 100 to form a build-up of material 150. In particular, as shown in FIG. 2, support ends 160 of the inner portion 140 are especially problematic with the build-up of material 150 in the related art.

While a small amount of material wound up around the pick-up head 100 does not necessarily create a problem, over time a continued build-up of material 150 may impair rotation of the pick-up head 100, cause damage to the equipment, or increase fuel/energy consumption of the equipment. To address the issue of build-up in the related art, frequent cleaning, service, and maintenance is required. As a result, increased time, labor, and cost are associated with the pick-up heads 100 in the related art.

SUMMARY OF THE INVENTION

According to one embodiment of the present disclosure, a pick-up head may be provided with an anti-wrapping device to at least partially fill in gap areas between the tine bars and an end of the pick-up head. In one embodiment, the anti-wrapping device may be rotated together with the pick-up head to create a moving surface that is less susceptible to wrapping. In one embodiment, the anti-wrapping device may be provided as a disc including mounting holes. In some embodiments, the disc may be circular. The plurality of tine bars may be mounted to the mounting holes of the disc in order to create an overlap, partially filling in gaps between the tine bars and thereby preventing wrapping. By minimizing gaps, wrapping of materials may be minimized.

In one embodiment, the tine bars may be mounted to extend through the anti-wrapping device, thereby creating a moving surface without necessarily filling in gaps. The anti-wrapping device may be rotated together with the plurality of tine bars to create a non-static surface that is less susceptible to wrapping of materials.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
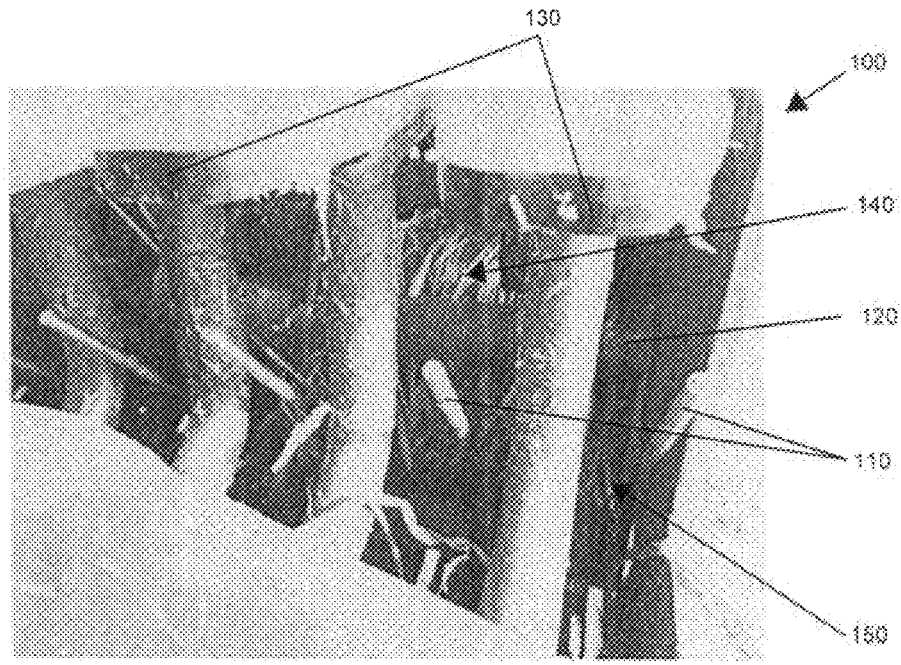
FIG. 1 depicts a perspective view of one end of a pick-up head in the related art.
Figure 2:
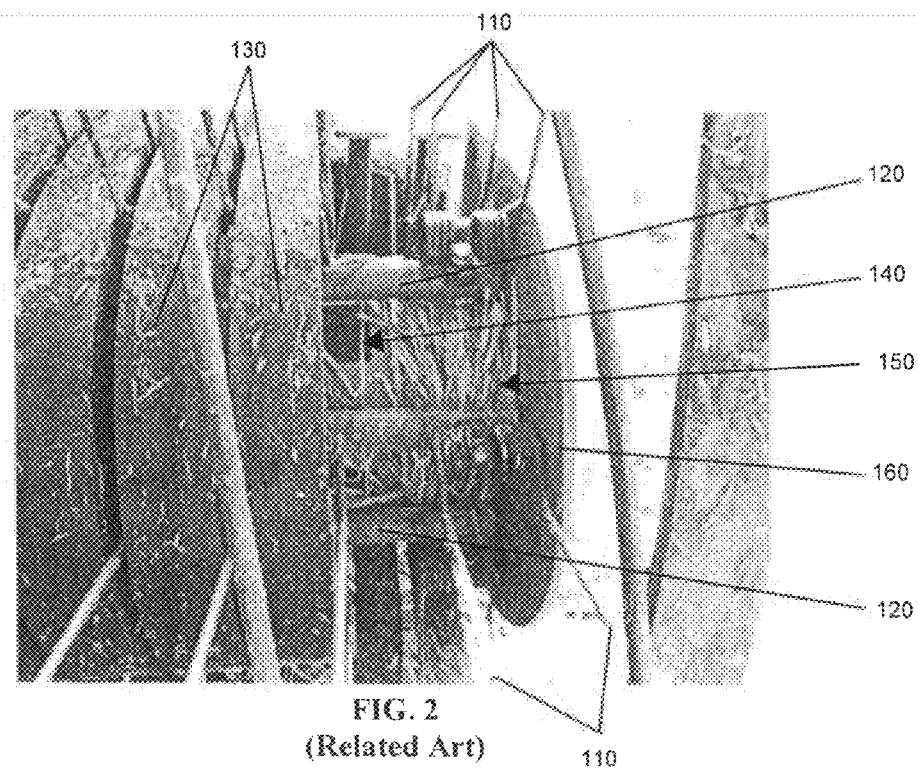
FIG. 2 depicts a perspective view of the one end of the pick-up head with pick-up guards removed from the one end in the related art.

Referring now to the drawings, wherein like reference numerals designate identical or corresponding parts throughout the several views. It is noted that as used in the specification and the appending claims the singular forms "a," "an," and "the" can include plural references unless the context clearly dictates otherwise.

Objects, advantages, and features of the exemplary anti-wrapping device for a pick-up head described herein will be apparent to one skilled in the art from a consideration of this specification, including the attached drawings.

Figure 3:
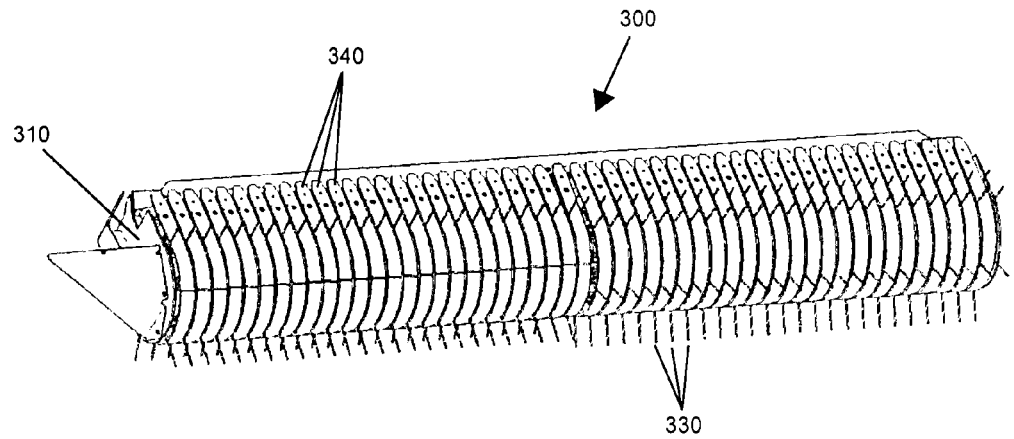
FIG. 3 depicts a left perspective view of a pick-up head including an anti-wrapping device according to the present disclosure.
Figure 4:
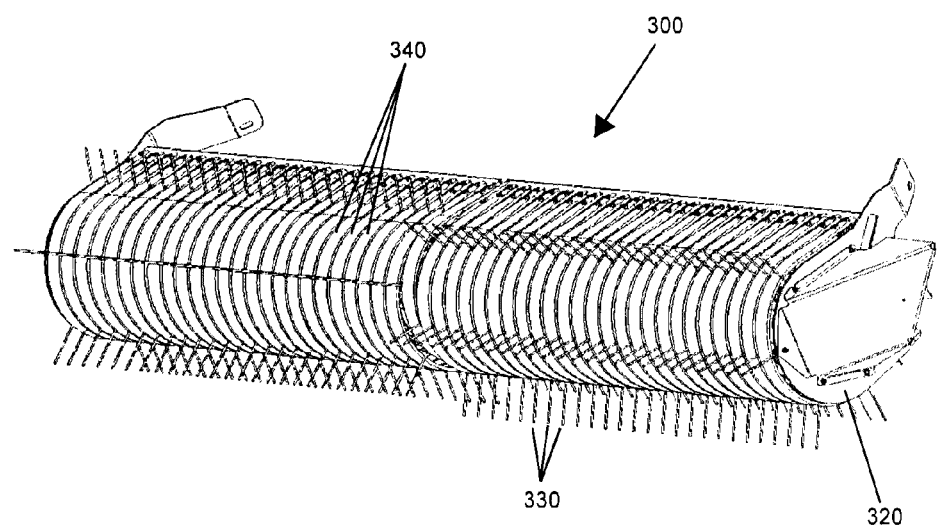
FIG. 4 depicts a right perspective view of a pick-up head including an anti-wrapping device according to the present disclosure.
Figure 5:
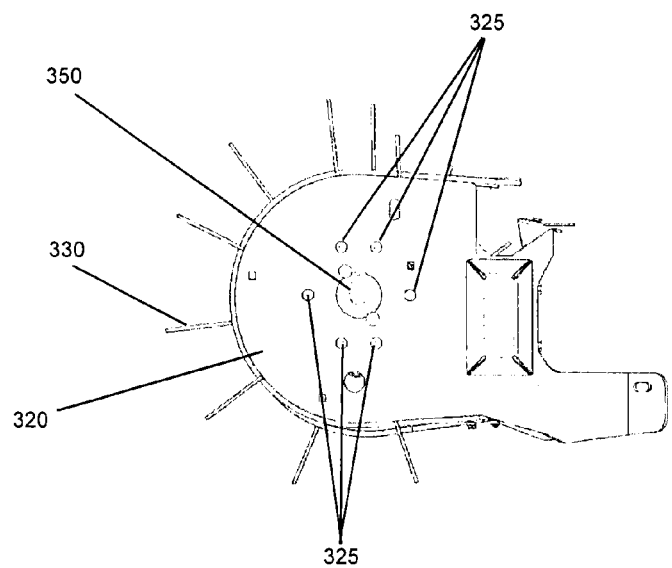
FIG. 5 depicts a side view of a pick-up head including an anti-wrapping device according to the present disclosure.

In one embodiment, as shown in FIGS. 3-5, a pick-up head 300 including an anti-wrapping device of the present disclosure may include a first end plate 310, a second end plate 320, a plurality of pick-up teeth 330, and a plurality of pick-up guards 340. The first end plate 310 and the second end plate 320 may be secured to a frame member of the pick-up head 300. As shown in FIG. 5, one or more of the first end plate 310 and second end plate 320 may support a drive shaft 350 which transfers a rotational force to drive the plurality of pick-up teeth 330.

Figure 6:
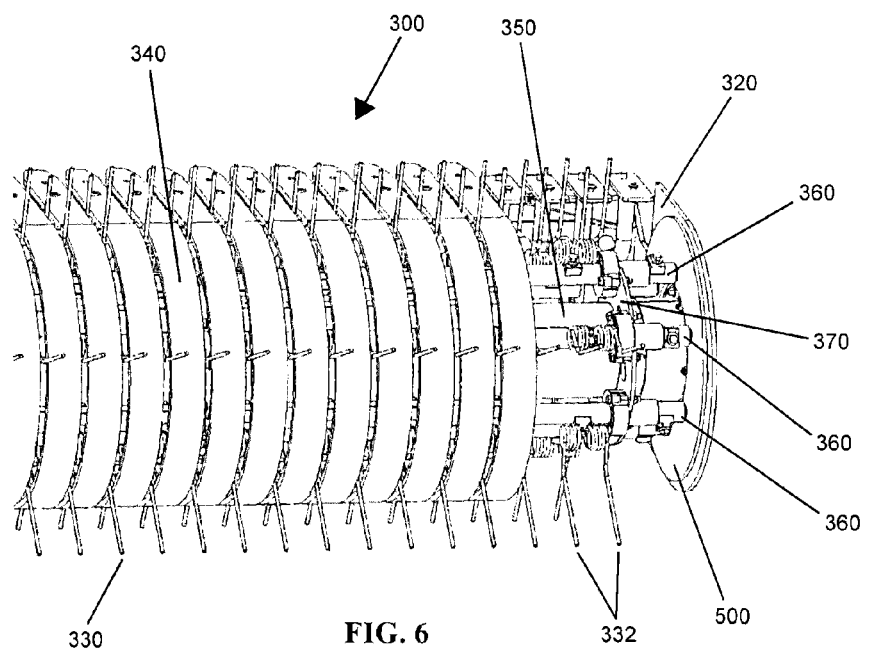
FIG. 6 depicts a perspective view of one end of a pick-up head including an anti-wrapping device according to the present disclosure with pick-up guards removed from the one end.
Figure 7:
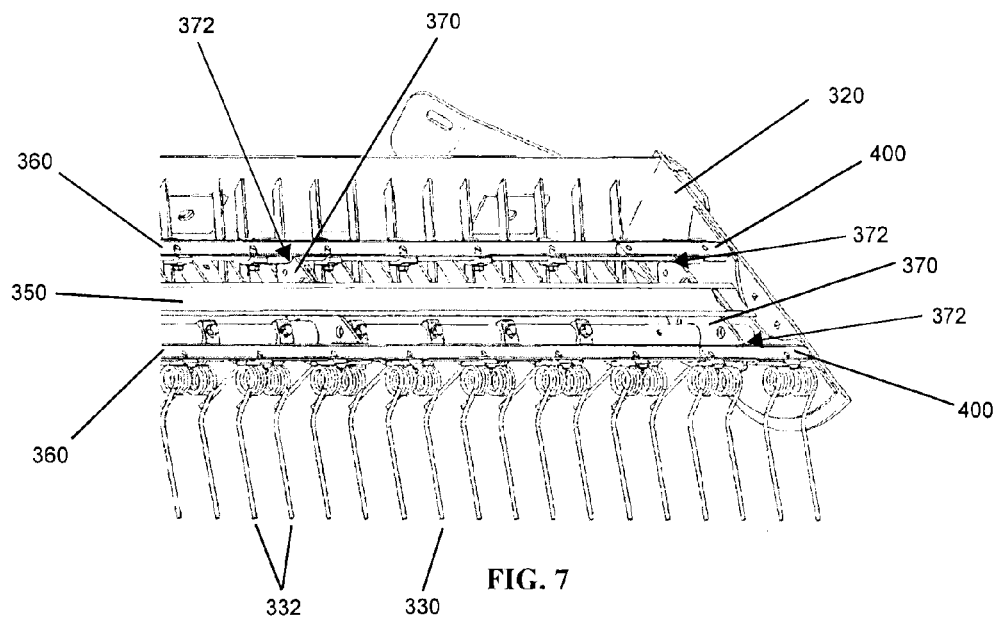
FIG. 7 depicts a perspective cross sectional view of one end of a pick-up head including an anti-wrapping device according to the present disclosure.
Figure 8:
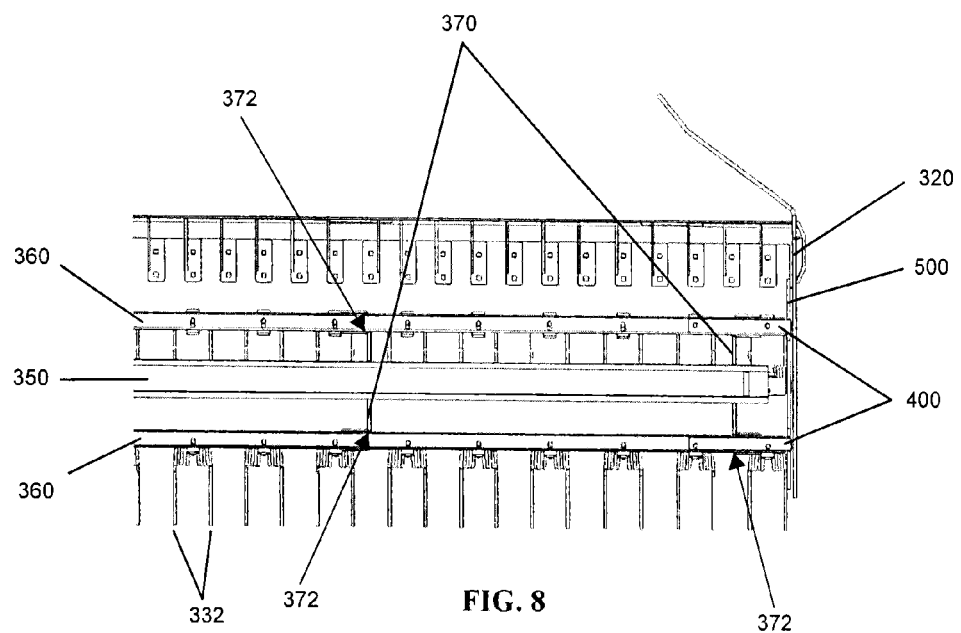
FIG. 8 depicts a top cross sectional view of one end of a pick-up head including an anti-wrapping device according to the present disclosure.

In one embodiment, one end of the pick-up head 300 including an anti-wrapping device 500 as shown in FIGS. 6-8. The pick-up head 300 may include a plurality of pick-up bars or tine bars 360 that carry the plurality of pick-up teeth 330. In one embodiment, the pick-up teeth 330 may be coil-type teeth which provide some give in the event any of the pick-up teeth 330 strike the ground or a foreign object, thereby providing a level of resiliency and damage protection. In one embodiment, the pick-up teeth 330 may be installed in groups of two or more teeth 332 onto the tine bars 360 to improve manufacturability and reduce installation and maintenance time.

In one embodiment, a drive plate 370 may be provided to support the plurality of tine bars 360 onto the drive shaft 350. The drive plate 370 may have a plurality of apertures 372 sized to receive and support the plurality of tine bars 360. The drive plate 370 may be secured to the drive shaft 350 or may be made integral with the drive shaft 350. A plurality of drive plates 370 may be provided to support the plurality of tine bars 360 along a length of the pick-up head 300.

In one embodiment, an anti-wrapping device 500 may be provided adjacent to a first end plate 310 and/or a second end plate 320. The anti-wrapping device 500 may be secured to an end side of the plurality of tine bars 360 creating a surface rotatable with the tine bars 360 that is less susceptible to wrapping of material. In doing so, the anti-wrapping device 500 may shield a static surface of the first end plate 310 and/or the second end plate 320. The anti-wrapping device may fill in gaps between the tine bars 360.

Figure 9A:
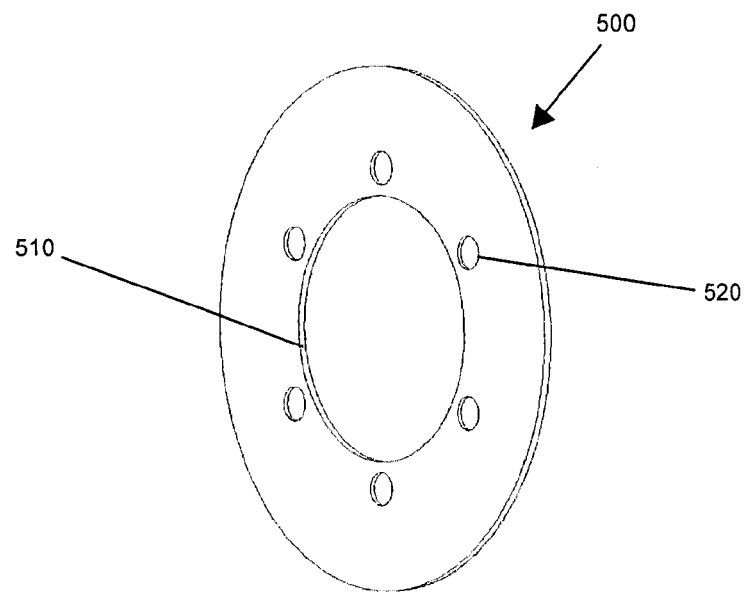
FIGS. 9A-B depict a top and side perspective views respectively, of an anti-wrapping device according to the present disclosure.
Figure 9B:
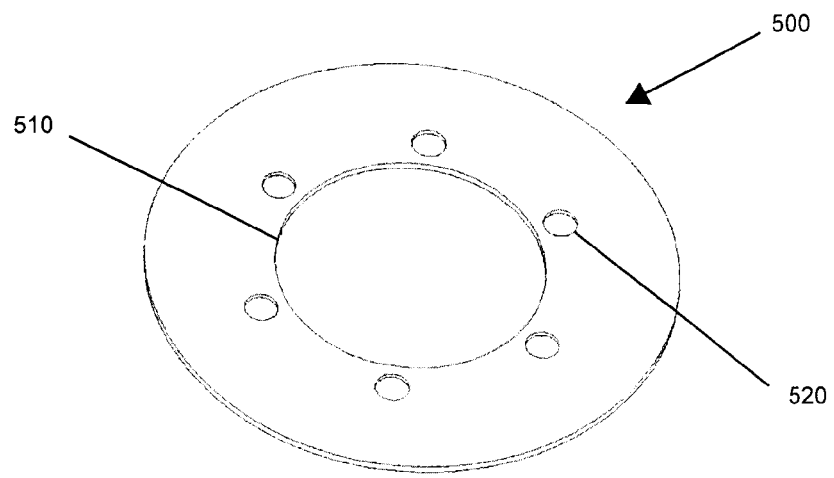

In one embodiment, as shown in FIGS. 9A and 9B, the anti-wrapping device 500 may be in the form of a disc and may include a central cutout 510 and a plurality of mounting holes 520. The mounting holes 520 may be used to secure the anti-wrapping device 500 to an end side of the plurality of tine bars 360.

In one embodiment, mounting stems 400 may be provided to secure the anti-wrapping device 500 to an interior surface of the tine bars 360. The mounting stems 400 may be adjusted laterally with respect to the anti-wrapping device 500 in order to laterally position the anti-wrapping device 500 and ensure that sufficient clearance is provided between the anti-wrapping device 500 and the first end plate 310 or the second end plate 320, while maintaining wrap prevention capabilities. In one embodiment, adjustment of the mounting stems 400 and/or the anti-wrapping device 500 with respect to one another may be accomplished with at least one spring-loaded mechanism. In one embodiment, the spring-loaded mechanism may be a spring or spring washer.

Figure 10:
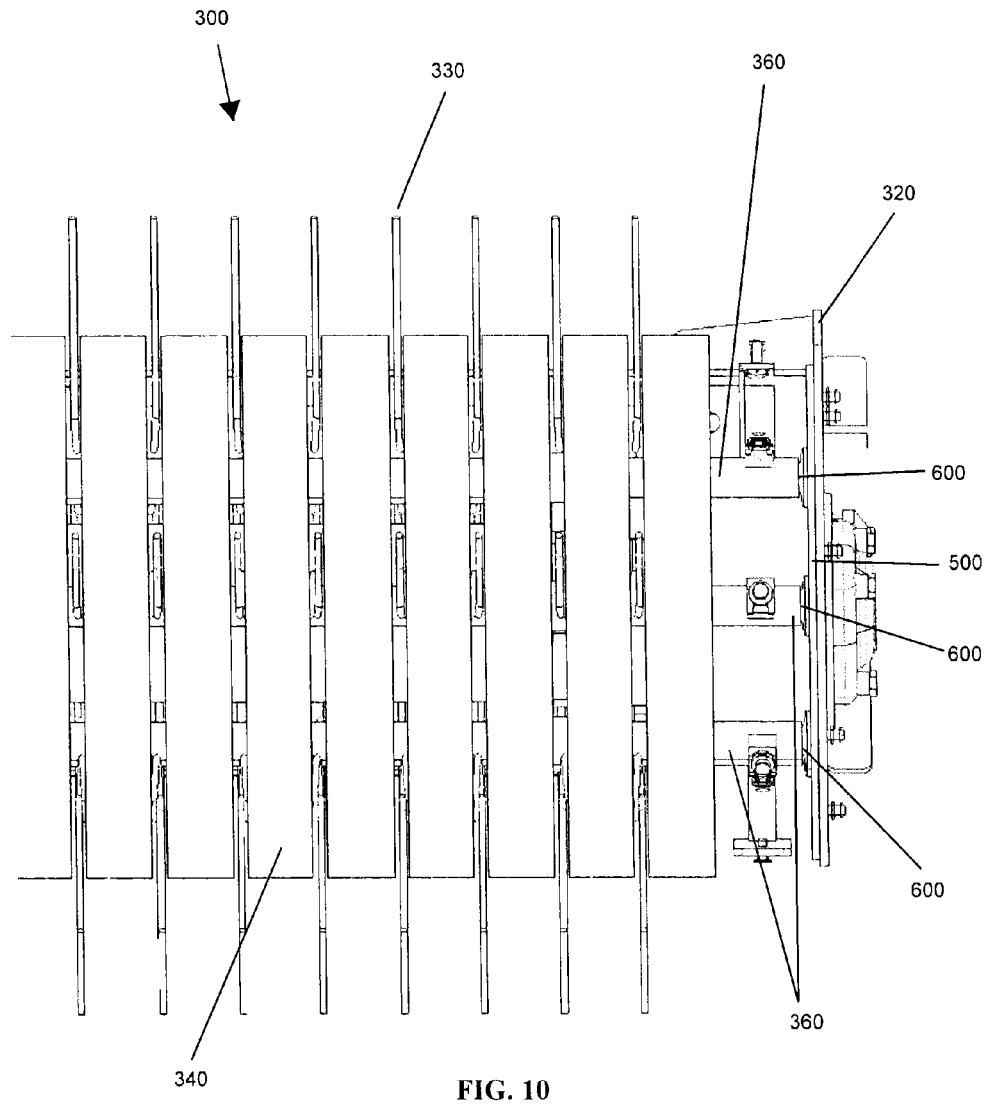
FIG. 10 depicts a top perspective view of a pick-up head including an anti-wrapping device and at least one spring-loaded mechanism according to the present disclosure.

In one embodiment, the anti-wrapping device 500 may be in the form of a disc that maintains contact with an adjacent first end plate 310 or the second end plate 320. In one embodiment, the anti-wrapping device 500 maintains contact with the adjacent first end plate 310 or second end plate 320 via at least one spring-loaded mechanism that is disposed between the anti-wrapping device 500 and an end of the plurality of tine bars 360. In one embodiment, as shown in FIG. 10, at least one spring washer 600 may be provided between an end of each of the tine bars 360 and the anti-wrapping device 500 in order to bias the anti-wrap device 500 to maintain contact with the second end plate 320.

In one embodiment, the tine bars 360 may pass through the disc of the anti-wrapping device 500, thereby creating a moving surface without filling in gaps. The anti-wrapping device 500 may be rotated together with the plurality of tine bars 360 to create a non-static surface that is less susceptible to wrapping of materials. In one embodiment, the disc may be supported by an exterior surface of the tine bars 360. In one embodiment (not shown), the tine bars 360 may pass through the first end plate 310 and/or the second end plate 320. By allowing the tine bars 360 to pass through the first end plate 310 and/or the second end plate 320, additional tolerance in manufacturing and assembly may be provided.

In one embodiment, the first end plate 310 and/or the second end plate 320 may be provided with a plurality of holes 325 for securing the anti-wrapping device 500 to the tine bars 360, or to adjust a position of the mounting stems 400 and the anti-wrapping device 500.

It is understood that a pick-up head including an anti-wrapping device of the present disclosure is not limited to the particular embodiments disclosed herein, and numerous modifications and variations are possible in light of the above teachings. It is therefore to be understood that within the scope of the appended claims, a pick-up head according to the present disclosure may be practiced otherwise than as specifically described herein.

The invention claimed is:

1. A pick-up device, comprising:
    a first end plate;
    a second end plate secured to the first end plate via a frame member;
    a drive shaft supported by at least one of the first end plate and the second end plate;
    a drive member provided on the drive shaft and rotatable with the drive shaft;
    a plurality of tine bars supported by the drive member so as to be rotatable with the drive member and the drive shaft;
    a plurality of pick-up teeth attached to the plurality of tine bars; and
    a first anti-wrapping device secured adjacent to a first end of the plurality of tine bars, the first anti-wrapping device being rotatable with the plurality of tine bars to prevent wrapping of material around the pick-up device,
    wherein the first anti-wrapping device is disposed between the drive member and the first end plate in a direction parallel to an axis of the drive shaft.

2. The pick-up device according to claim 1, wherein the first anti-wrapping device is secured adjacent to the first end of the plurality of tine bars via a first set of mounting stems, the first set of mounting stems being slidable within an inner surface of the tine bars to adjust and lock the first anti-wrapping device at a first position relative to the first end plate.

3. The pick-up device according to claim 2, wherein a second anti-wrapping device secured adjacent to a second end of the plurality of tine bars, the second anti-wrapping device being rotatable with the plurality of tine bars to prevent wrapping of material around the pick-up device.

4. The pick-up device according to claim 3, wherein the second anti-wrapping device is secured adjacent to the second end of the plurality of tine bars via a second set of mounting stems, the second set of mounting stems being slidable within an inner surface of the tine bars to adjust and lock the second anti-wrapping device in different positions relative to the second end plate.

5. The pick-up device according to claim 1, wherein the first anti-wrapping device is mounted to an external surface of the first end of the plurality of tine bars.

6. The pick-up device according to claim 1, wherein the plurality of tine bars extends through the first anti-wrapping device.

7. The pick-up device according to claim 1, wherein the plurality of tine bars extends through the first end plate.

8. The pick-up device according to claim 1, wherein the first anti-wrapping device maintains contact with the first end plate.

9. The pick-up device according to claim 1, wherein the first anti-wrapping device maintains contact with the first end plate via a spring-loaded mechanism to maintain a predetermined distance between the first anti-wrapping device and the first end plate.

10. The pick-up device according to claim 9, wherein the spring-loaded mechanism is a spring or a spring washer.

11. The pick-up device according to claim 3, wherein the second anti-wrapping device is mounted to an external surface of the second end of the plurality of tine bars.

12. The pick-up device according to claim 3, wherein the plurality of tine bars extends through the second anti-wrapping device.

13. The pick-up device according to claim 3, wherein the plurality of tine bars extends through the second end plate.

14. The pick-up device according to claim 3, wherein the second anti-wrapping device maintains contact with the second end plate.

15. The pick-up device according to claim 3, wherein the second anti-wrapping device maintains contact with the second end plate via a spring-loaded mechanism to maintain a predetermined distance between the second anti-wrapping device and the second end plate.

16. The pick-up device according to claim 15, wherein the spring-loaded mechanism is a spring or a spring washer.

17. The pick-up device according to claim 1, wherein the anti-wrapping device is a disc.

18. The pick-up device according to claim 17, wherein the anti-wrapping device includes a central cutout and a plurality of mounting holes through which the plurality of tine bars are secured to the anti-wrapping device.

19. The pick-up device according to claim 1, wherein the drive member is a drive plate.

* * * * *